US008036777B2

(12) United States Patent
Chang

(10) Patent No.: US 8,036,777 B2
(45) Date of Patent: Oct. 11, 2011

(54) ROOM LIGHTING ATMOSPHERE CREATING SYSTEM

(75) Inventor: Chris Chang, Taipei (TW)

(73) Assignee: Qlifeplus Co., Taipei (TW)

( * ) Notice: Subject to any disclaimer, the term of this patent is extended or adjusted under 35 U.S.C. 154(b) by 0 days.

(21) Appl. No.: 12/003,633

(22) Filed: Dec. 28, 2007

(65) Prior Publication Data

US 2008/0177402 A1    Jul. 24, 2008

(30) Foreign Application Priority Data

Dec. 28, 2006  (TW) .............................. 95222990 U

(51) Int. Cl.
*G08B 9/00* (2006.01)
*G05B 15/02* (2006.01)
*G05B 11/01* (2006.01)
*G05B 13/02* (2006.01)
*G01B 15/00* (2006.01)

(52) U.S. Cl. .............. 700/275; 340/286.02; 340/310.11; 340/825.69; 700/9; 700/11; 700/22; 700/46

(58) Field of Classification Search ................ 294/94.4; 700/275, 9, 11, 22, 46; 340/286.02, 310.11, 340/825.69
See application file for complete search history.

(56) References Cited

U.S. PATENT DOCUMENTS

| | | | | |
|---|---|---|---|---|
| 4,711,394 A | * | 12/1987 | Samuel | 236/49.3 |
| 5,165,465 A | * | 11/1992 | Kenet | 165/11.1 |
| 5,318,224 A | * | 6/1994 | Darby et al. | 236/47 |
| 6,771,164 B1 | * | 8/2004 | Fink | 340/12.3 |
| 6,997,390 B2 | * | 2/2006 | Alles | 236/49.4 |
| 7,132,956 B2 | * | 11/2006 | Haruki | 340/12.53 |
| 7,398,127 B2 | * | 7/2008 | Boger et al. | 700/9 |
| 7,437,596 B2 | * | 10/2008 | McFarland | 714/47.2 |
| 2004/0160897 A1 | * | 8/2004 | Fowler et al. | 370/241 |
| 2006/0071087 A1 | * | 4/2006 | Kates | 236/1 B |
| 2006/0074494 A1 | * | 4/2006 | McFarland | 700/1 |
| 2007/0142927 A1 | * | 6/2007 | Nelson | 700/11 |

* cited by examiner

*Primary Examiner* — Albert Decady
*Assistant Examiner* — Thomas Stevens
(74) *Attorney, Agent, or Firm* — Muncy, Geissler, Olds & Lowe, PLLC

(57) ABSTRACT

The present invention relates to a room atmosphere creating system having a microprocessor electrically connected to a sensing circuit, a storage memory, and a distributing unit. The distributing unit is connected to an atmosphere circuit. The microprocessor transmits the room atmosphere conditions in the storage memory to the atmosphere circuit via the distributing unit. The room atmosphere conditions controlled by the atmosphere circuit are divided into audio condition, light condition, and temperature condition. The light device, temperature device, and audio device generate corresponding room atmosphere effects to synchronously control the light, temperature, and audio effects in accordance with the room atmosphere mode set by the user, and in cooperation with the wireless circuit for receiving the room atmosphere conditions transmitted by the wireless remote control, remote controlling of the room atmosphere conditions is able to be achieved. If there is an emergency such as a fire alarm, the system may immediately stop the normal visual and audio effects and generate warning signals.

8 Claims, 5 Drawing Sheets

ROOM LIGHTING ATMOSPHERE CREATING SYSTEM

BACKGROUND

1. Field of the Invention

The present invention is to provide a room atmosphere creating system, in particular a system which can control the effects of light, temperature, and audio in accordance with the room atmosphere mode set by the user.

2. Related Art

Most of traditional lights are used for illuminating and inable to create special room atmosphere. In addition, there is no connection or integration among the lights, and the controlling method thereof only involves switch on/off. Therefore, it is difficult to arrange the light intensity, color, and hue of different lights integrally. Along with the improvement of quality of life, people of nowadays desire light devices which can be modified in accordance with the room atmosphere condition in the illumination environment. Also, for the convenience of integrally control and disposition, a system for integrating various lighting devices via wireless transmission is further required.

SUMMARY OF THE INVENTION

The main objective of the present invention lies in: the room atmosphere creating system has a microprocessor electrically connected to a sensing circuit, a storage memory, and a distributing unit. The distributing unit is connected to an atmosphere circuit. The microprocessor transmits the room atmosphere conditions in the storage memory to the atmosphere circuit via the distributing unit. The room atmosphere conditions controlled by the atmosphere circuit are divided into audio condition, light condition, and temperature condition. The light device, temperature device, and audio device generate corresponding effects to synchronously control the light, temperature, and audio effects in accordance with the room atmosphere mode set by the user. If there is an emergency such as a fire alarm, the system may immediately stop the normal visual and audio effects and generate warning signals. The atmosphere circuit controls corresponding light device, temperature device, and audio device in accordance with the audio condition, light condition, and temperature condition.

The secondary objective of the present invention lies in: the room atmosphere creating system is provided with a wireless circuit electrically connected to the microprocessor for receiving the room atmosphere conditions transmitted by an external wireless remote control.

Another objective of the present invention lies in: the microprocessor of the room atmosphere creating system is electrically connected to a data receiving unit, the data receiving unit is mainly for receiving the audio condition, light condition, and temperature condition of the room atmosphere conditions, and the adjusted room atmosphere conditions are transmitted to the distributing unit via the microprocessor, whereby the output audio condition, light condition, and temperature condition are modified by the atmosphere circuit.

Another objective of the present invention lies in: the microprocessor of the room atmosphere creating system is electrically connected to a connecting port, the connecting port is mainly for connection with external devices, and by the aforementioned techniques, the room atmosphere creating system of the present invention may communicate the room atmosphere conditions with the external devices.

Another objective of the present invention lies in: the microprocessor of the room atmosphere creating system is electrically connected to a power managing circuit, the power managing circuit may set the components of the room atmosphere creating system to a power saving mode.

DETAILED DESCRIPTION

In order to achieve the above objectives and effects, the technical features and means utilized by the present invention will be described in details with reference to the accompanying drawings hereinafter.

Figure 1:
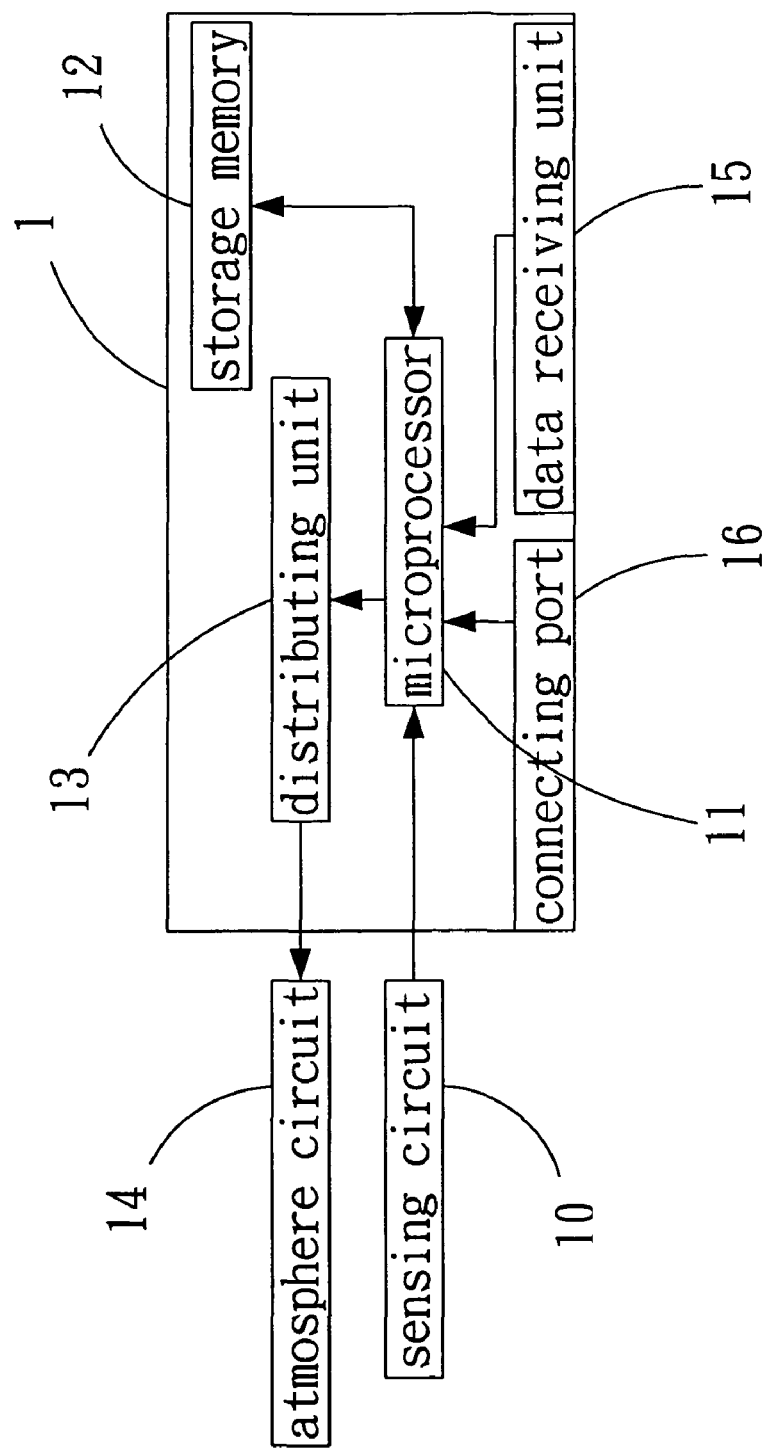
FIG. 1 is the first block diagram according to a preferred embodiment of the present invention.
Figure 2:
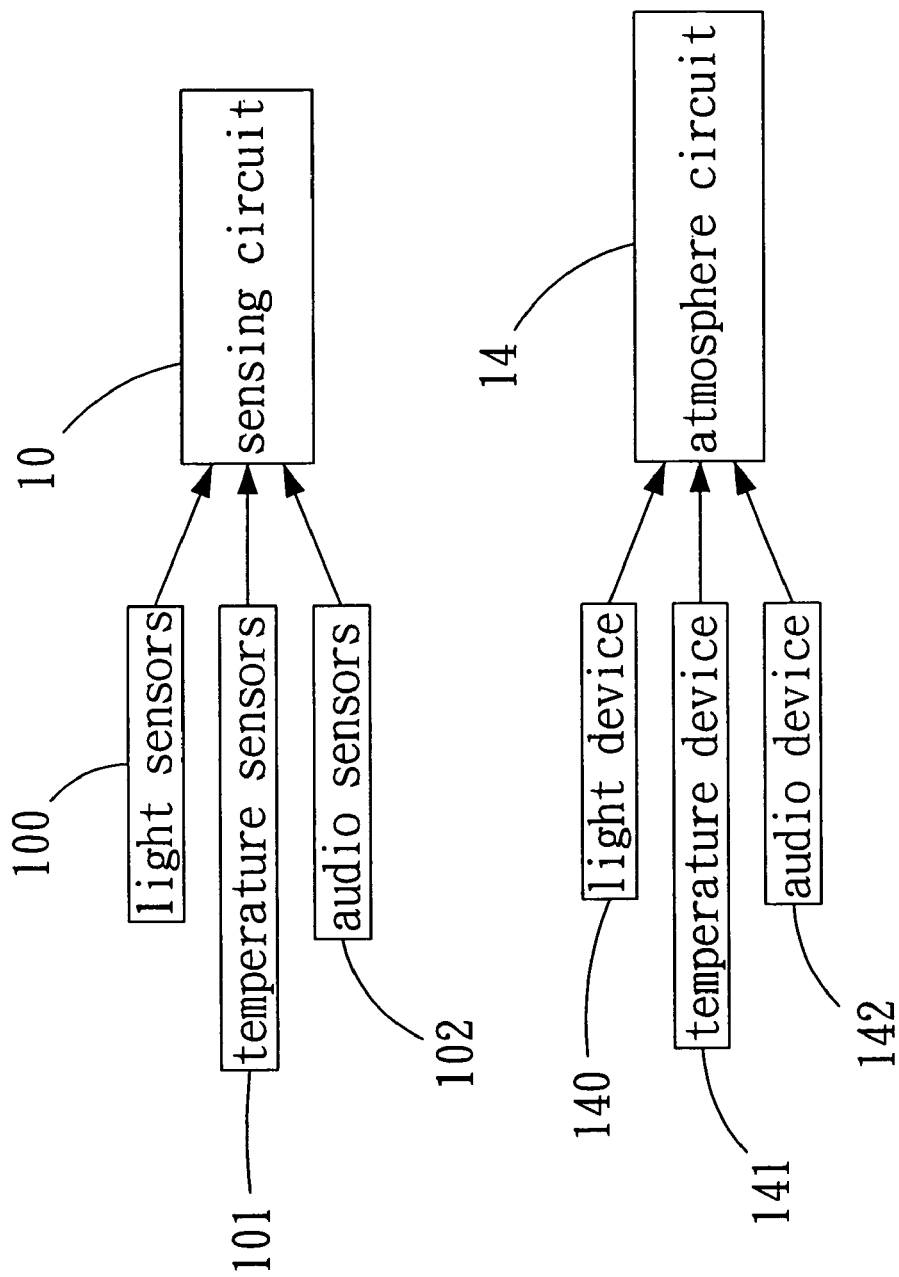
FIG. 2 is the second block diagram according to a preferred embodiment of the present invention.

Please refer to the disclosures of FIG. 1 and FIG. 2, which are the first and second block diagrams according to a preferred embodiment of the present invention. It is apparent from the figures that the room atmosphere creating system 1 of the present invention includes:

a sensing circuit 10 mainly for detecting current room atmosphere condition and generating room atmosphere data, the sensing circuit 10 comprising at least one or more light sensors 100, one or more temperature sensors 101, and one or more audio sensors 102, so as to generate the room atmosphere data comprising light color, light intensity, temperature, humidity, audio type and so on;

a microprocessor 11 (including digital signal processor DSP) mainly for accessing set room atmosphere conditions and receiving/transmitting related settings of the room atmosphere conditions from/to the outside, the room atmosphere conditions including light color, light intensity, type of light, temperature, humidity, audio type etc., also, the microprocessor 11 performing data transmission and processing between the components of the present invention;

a storage memory 12 which stores preset room atmosphere conditions, the room atmosphere conditions may be added, deleted, and modified, the storage memory 12 may be one of a memory card, a hard disk, a flash memory, a rewritable disc, or a read-/writable memory;

a distributing unit 13 mainly for outputting the room atmosphere conditions and dividing the room atmosphere conditions at least into audio condition, light condition, and temperature condition;

a atmosphere circuit 14 mainly for receiving audio condition, light condition, and temperature condition, whereby causing a light device 140, a temperature device 141, and an audio device 142 to generate corresponding effects; the atmosphere circuit 14 may be directly disposed within the light device 140, the temperature device 141, and the audio device 142, or connected to the light device 140, the temperature device 141, and the audio device 142 via transmission lines, wires etc.; the light device 140 may be one of a wall lamp, a ceiling lamp, a desk lamp, a standing lamp, a table lamp, a bed lamp, or an indoor lighting device, the temperature device 141 may be one of an electric fan, a dehumidifier, a window type air conditioner, a split type air conditioner, a package type air conditioner, or an indoor air conditioning device, and the audio device 142 may be one of a home theater, a desktop stereo, a bed stereo, a CRT display, an LCD, a multimedia player or indoor multimedia outputting device;

a data receiving unit 15 for manually or automatically setting the room atmosphere conditions and transmitting the adjusted room atmosphere condition, the data receiving unit 15 may be one of a wall switch, a stem mounted switch, a button switch, a toggle switch, a keyboard, or a touch panel;

a connecting port 16 mainly for connecting to external devices, so that the room atmosphere conditions can be communicated between the external devices and the room atmosphere creating system 1, the connecting port 16 may be one of a universal serial bus (USB), a wireless USB, an IEEE (Institute of Electrical and Electronics Engineers) 1394 connecting port, a coaxial cable connector or an Ethernet connector, or a memory card slot.

The aforementioned microprocessor 11, distributing unit 13, and atmosphere circuit 14 may be one of a single chip, a complex programmable logic device (CPLD), a DSP, a field programmable gate array (FPGA), a programmable logic controller (PLC), or an electronic circuit made up of active/passive components. The distributing unit 23 may further be DMX512, DALI (digital addressable lighting interface), or X10 (industrial standard). The DMX512 is a protocol proposed by USITT exclusively for data communication between the stage light console and the dimmer, which is then extended to controlling of stage equipments such as computer lightings and color changers. The DMX512 is an approach for the console to digitally connect to and control the dimmer, which is easy and reliable, and can be a good controlling apparatus in addition to being the dimmer. Further, the sensing circuit 10 may be further connected to a movement sensor and a gas sensor. The movement sensor can detect the movement of people in reality and further provides movement parameters of the people. The gas sensor can detect the presence of gas in the environment to enhance domestic safety.

Among the aforementioned components, the microprocessor 11 is connected to the sensing circuit 10, the storage memory 12, the distributing unit 13, the data receiving unit 15, and the connecting port 16 respectively, while the distributing unit 13 is connected to the atmosphere circuit 14, so that upon operation of the aforementioned components, required room atmosphere is mainly received and selected by the data receiving unit 15. The microprocessor 11 transmits the selected room atmosphere condition from the storage memory 12 to the distributing unit 13. The distributing unit 13 divides the room atmosphere conditions into audio condition, light condition, temperature condition and transmits to the atmosphere circuit 14, then the atmosphere circuit 14 transmits the light condition to the light device 140, the temperature condition to the temperature device 141, and the audio condition to the audio device 142, so that the light device 140 generates corresponding light effect, the temperature device 141 generates corresponding temperature effect, and the audio device 142 generates corresponding audio effect.

In the meantime, the light sensors 100, the temperature sensors 101, and the audio sensors 102 of the sensing circuit 10 detect the current room atmosphere conditions in real time and transmit the light color, light intensity, temperature, humidity, and audio type from the sensing circuit 10 to the microprocessor 11, so the microprocessor 11 may compare and modify the room atmosphere conditions to cause the distributing unit 13 to finely adjust the light device 140, temperature device 141, and audio device 142 connected to the atmosphere circuit 14 as needed to maintain the best room atmosphere.

Further, the room atmosphere conditions may be manually or automatically modified by the data receiving unit 15, which mainly receives the audio condition, light condition, and temperature condition of the room atmosphere conditions. The data receiving unit 15 transmits the received room atmosphere conditions to the microprocessor 11, and the distributing unit 13 modifies the audio condition, light condition, and temperature condition output by the atmosphere circuit 14, so that the connected light device 140, temperature device 141, and audio device 142 may generate corresponding effect in accordance with the modified room atmosphere conditions. Further, the adjusted room atmosphere conditions may be collected by the sensing circuit 10, and the light sensors 100, temperature sensors 101, and audio sensors 102 transmit the current light color, light intensity, temperature, humidity, audio type to the microprocessor 11 from the sensing circuit 10. Then the microprocessor 11 writes the modified audio condition, light condition, and temperature condition into the storage memory 12 to generate new room atmosphere conditions.

Further, the room atmosphere creating system 1 may be connected to a memory stick or a memory card via the connecting port 16 such as an universal serial bus (USB) or a memory card slot. Also, when the connecting port 16 is a universal serial bus (USB), a wireless USB connecting port, it can be directly connected to devices such as PC, laptop, PDA. And when the connecting port 16 is an IEEE 1394 connecting port, a cable, or an Ethernet connector, it can be connected to devices such as PC, laptop, PDA via LAN or Internet. In this manner, the room atmosphere data can be transmitted between the aforementioned external devices and the storage memory 12.

Figure 3:
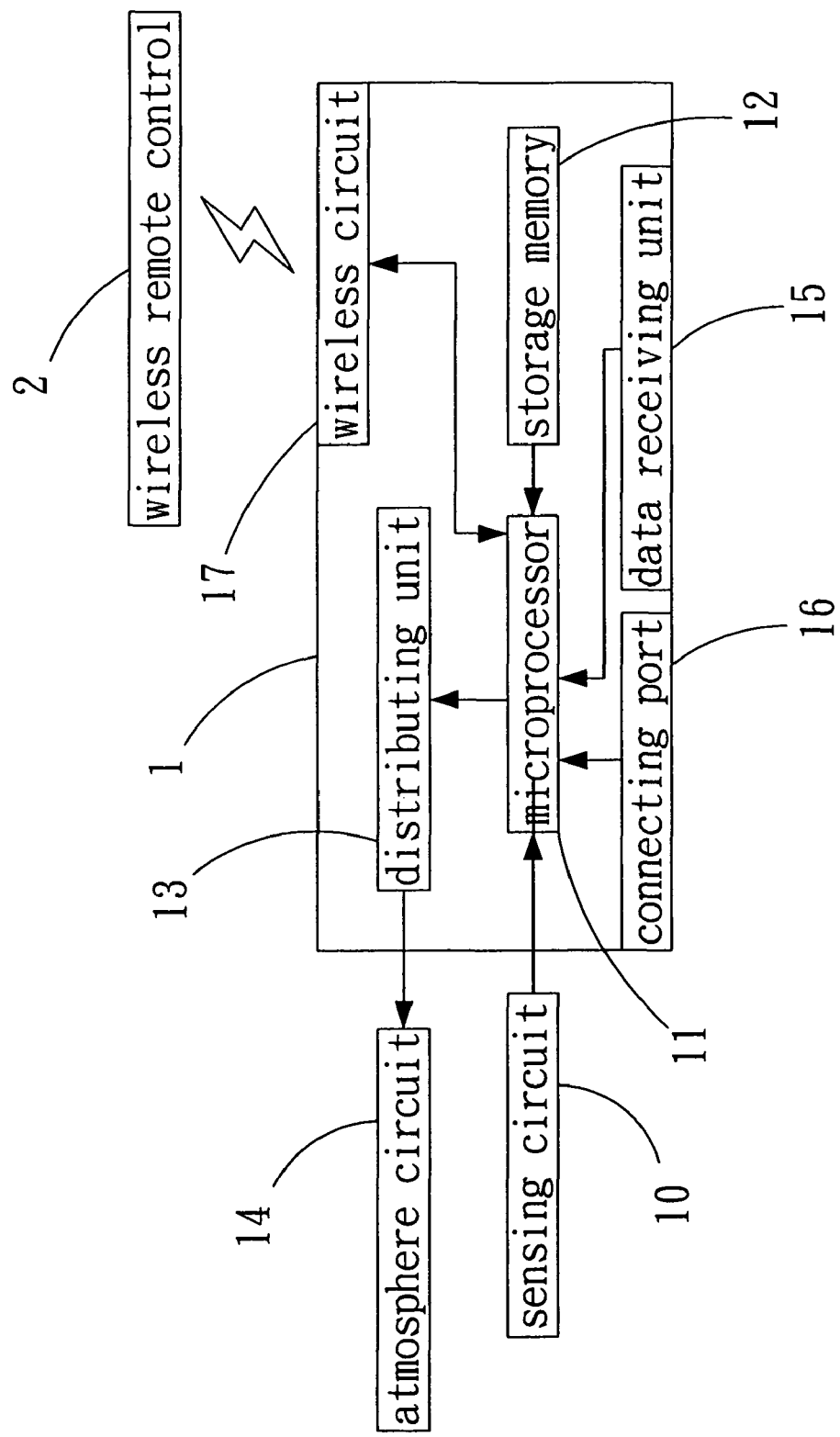
FIG. 3 is the first block diagram according to another preferred embodiment of the present invention.
Figure 4:
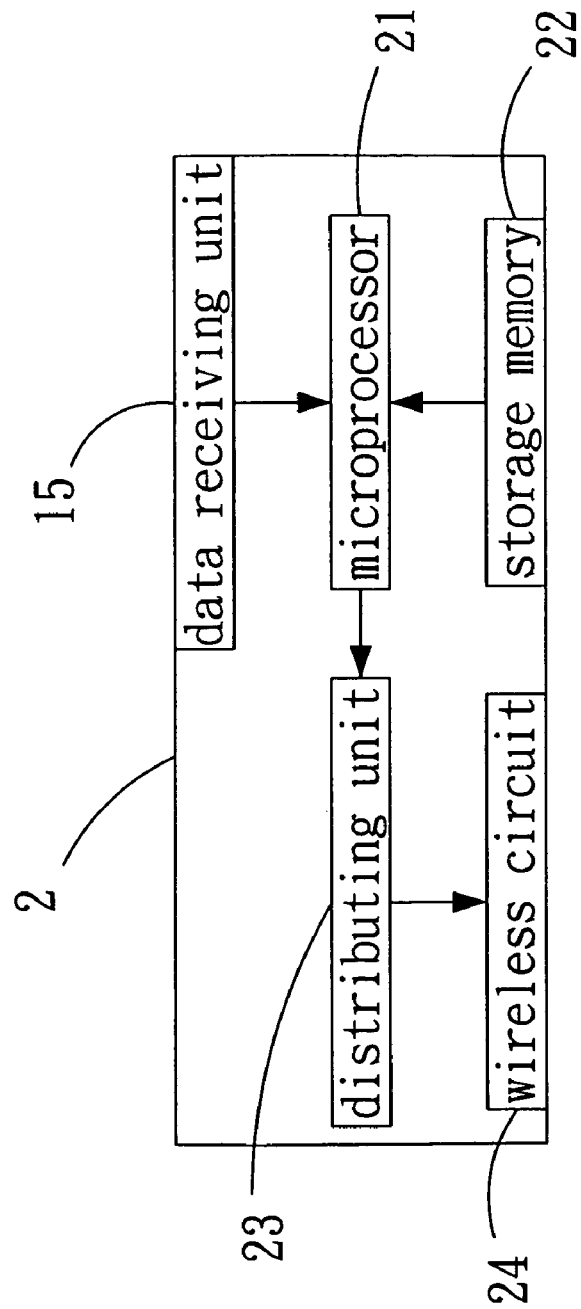
FIG. 4 is the second block diagram according to another preferred embodiment of the present invention.

Please refer to the disclosures of FIG. 3 and FIG. 4, which are the first and second block diagram according to another preferred embodiment of the present invention. It is apparent from the figures that the room atmosphere creating system 1 of the present invention is further provided with a wireless circuit 17 electrically connected to the microprocessor 11 for receiving the room atmosphere conditions transmitted by an external wireless remote control 2. The wireless remote control 2 includes:

a data receiving unit 15 for manually or automatically adjusting the settings of the room atmosphere conditions and transmitting the adjusted room atmosphere conditions, the data receiving unit 15 may be one of a stem mounted switch, a button switch, a toggle switch, a keyboard or a touch panel, and an infrared receiver;

a microprocessor 21 mainly for accessing set room atmosphere conditions and receiving/transmitting related settings of the room atmosphere conditions from/to the outside, the room atmosphere conditions including light color, light intensity, type of light, temperature, humidity, audio type etc., also, the microprocessor 21 performing data transmission and processing between the components of the wireless remote control 2, a storage memory 22 mainly for storing preset room atmosphere conditions, and the stored room atmosphere conditions may be added, deleted, or modified, the storage memory 22 may be one of a memory card, a hard disk, a flash memory, a rewritable disc, or a read-/writable memory;

a distributing unit 23 mainly for manually or automatically receiving the room atmosphere conditions and dividing the room atmosphere conditions at least into audio condition, light condition, and temperature condition;

a wireless circuit 24 mainly for transmitting the room atmosphere conditions comprising audio condition, light condition, and temperature condition to the room atmosphere creating system 1.

The aforementioned microprocessor 21, distributing unit 23, and wireless circuits 17 and 24 may be one of a single chip, a complex programmable logic device (CPLD), a DSP, a field programmable gate array (FPGA), a programmable logic controller (PLC); and the wireless circuits 17 and 24 may be Bluetooth, Wireless Fidelity (WI-FI), infrared, radio frequency identification (RF-ID) or 802.11, 802.15, while the distributing unit 23 may further be DMX512, DALI (digital addressable lighting interface), or X10 (industrial standard). The DMX512 is a protocol proposed by USITT exclusively for data communication between the stage light console and the dimmer.

Refer to FIG. 2 at the same time, which is the second block diagram according to a preferred embodiment of the present invention. Among the aforementioned components, the microprocessor 21 is connected to the data receiving unit 15, the storage memory 22, and the distributing unit 23 respectively, while the distributing unit 23 is connected to the wireless circuit 24, so that upon operation of the aforementioned components, required room atmosphere conditions are mainly received by the data receiving unit 15, and the microprocessor 21 transmits the selected room atmosphere condition from the storage memory 12 to the distributing unit 23. The distributing unit 23 divides the room atmosphere conditions into audio condition, light condition, temperature condition, and transmits to the wireless circuit 24, then the wireless circuit 24 transmits the room atmosphere conditions comprising audio condition, light condition, temperature condition to the wireless circuit 17;

after receiving the room atmosphere conditions comprising audio condition, light condition, temperature condition, the wireless circuit 17 transmits the room atmosphere data to the distributing unit 13 via the microprocessor 11. The distributing unit 13 divides the room atmosphere conditions into audio condition, light condition, temperature condition and transmits to the atmosphere circuit 14. The atmosphere circuit 14 transmits the light condition to the light device 140, the temperature condition to the temperature device 141, and the audio condition to the audio device 142, so that the light device 140 generates corresponding light effect, the temperature device 141 generates corresponding temperature effect, and the audio device 142 generates corresponding audio effect.

Further, the room atmosphere conditions may be adjusted by the data receiving unit 15. The data receiving unit 15 transmits the adjusted room atmosphere conditions to the distributing unit 13 via the microprocessor 21. The distributing unit 13 divides the room atmosphere conditions into audio condition, light condition, and temperature condition and transmits to the wireless circuit 24. Then the wireless circuit 24 transmits the room atmosphere conditions comprising audio condition, light condition, temperature condition to the wireless circuit 17. After the wireless circuit 17 receives the adjusted room atmosphere conditions, the room atmosphere data are transmitted to the distributing unit 13 via the microprocessor 11. The distributing unit 13 modifies the audio condition, light condition, temperature condition output by the atmosphere circuit 14 so that the connected light device 140, temperature device 141, and audio device 142 may generate corresponding effects in accordance with the modified room atmosphere conditions.

Further, the adjusted room atmosphere conditions may be collected by the sensing circuit 10, and the light sensors 100, the temperature sensors 101, and the audio sensors 102 transmit the current room atmosphere data such as light color, light intensity, temperature, humidity, and audio type to the microprocessor 11 from the sensing circuit 10. The microprocessor 11 then writes the modified audio condition, light condition, and temperature condition into the storage memory 12 to generate new room atmosphere condition. Also, the adjusted room atmosphere conditions may be transmitted to the wireless circuit 17 via the microprocessor 11, so that after the wireless circuit 24 receives the adjusted room atmosphere conditions, the microprocessor 21 may write the adjusted room atmosphere conditions into the storage memory 22.

Figure 5:
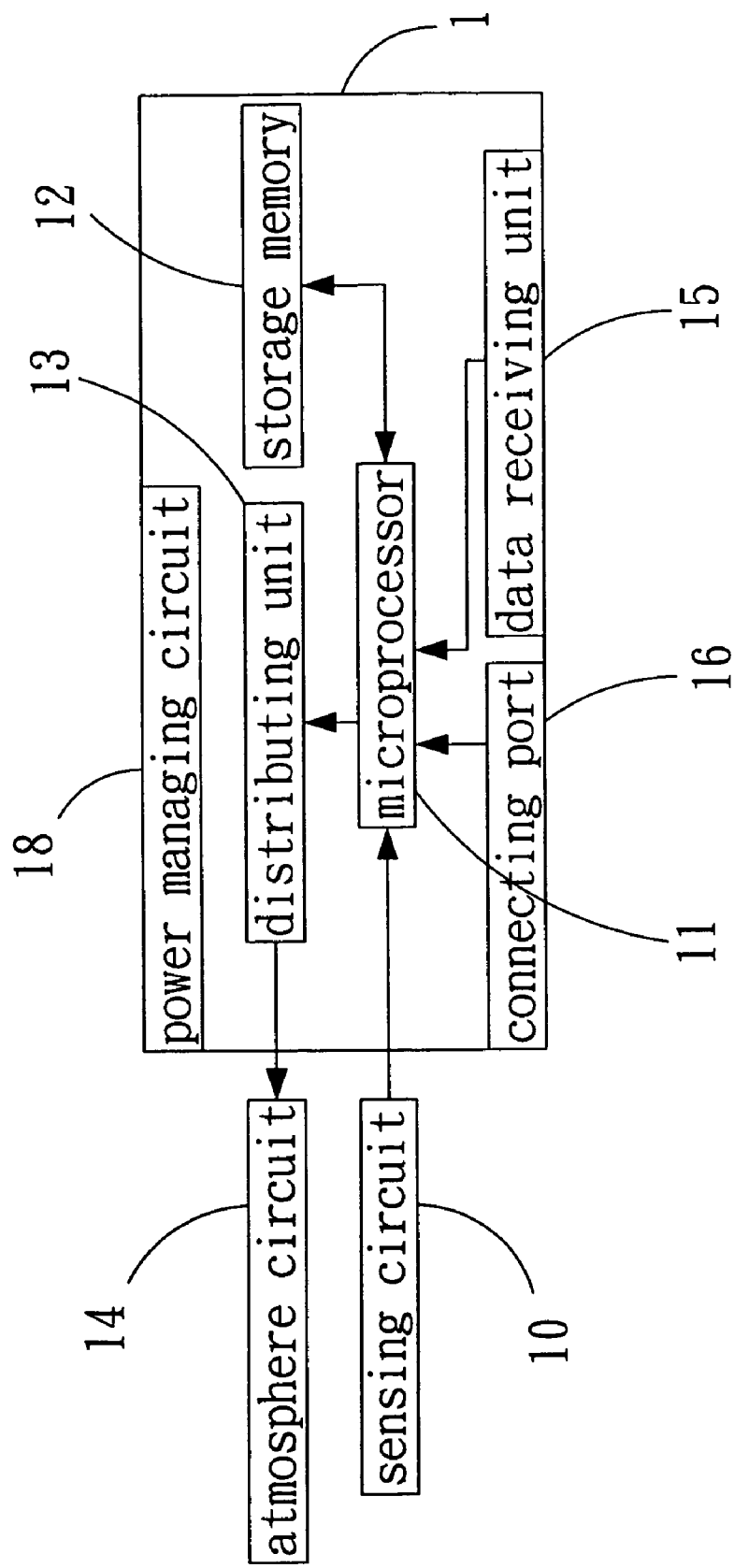
FIG. 5 is a block diagram according to yet another preferred embodiment of the present invention.

Please refer to the disclosure of FIG. 5, which is a block diagram according to yet another preferred embodiment of the present invention. It is apparent from the figure that the room atmosphere creating system 1 of the present invention is further provided with a power managing circuit 18 electrically connected to the microprocessor 11, the power managing circuit 18 may set the components of the room atmosphere creating system 1 to a power saving mode to prevent unnecessary waste of power resources.

However, the above descriptions only provide for preferred embodiments of the present invention and are not for limiting the scope of the claims of the present invention. Therefore, various modifications and amendments to the present invention may be made without departing from the scope disclosed by the specification and the drawings of the present invention.

What is claimed is:

1. A room lighting atmosphere creating system, comprising:
   a storage memory for storing and reading set room atmosphere conditions;
   a microprocessor for accessing the room atmosphere conditions in the storage memory and receiving external room atmosphere conditions;
   a data receiving unit for receiving or manually adjusting settings of the room atmosphere conditions and transmitting the adjusted room atmosphere conditions to the microprocessor;
   a distributing unit for receiving the room atmosphere conditions transmitted by the microprocessor and dividing the room atmosphere conditions at least into audio condition, light condition, and temperature condition signals;
   an atmosphere circuit for receiving the audio condition, light condition, and temperature condition signals transmitted by the distributing unit and generating corresponding effects; wherein the atmosphere circuit is connected to a light device, a temperature device, and an audio device;
   a connecting port for receiving the room atmosphere conditions transmitted from an external device, the connecting port being one of a USB, a wireless USB, a coaxial cable connector, an audio input, a video input, an Ethernet connector, or a memory card slot;
   a power managing circuit for managing use of power;
   a wireless circuit for receiving external room atmosphere conditions; the wireless circuit being a wireless transmission protocol related to one of Bluetooth, Wireless Fidelity (WI-FI), infrared, or radio frequency identification (RF-ID);
   wherein the microprocessor is electrically connected to a sensing circuit, the storage memory, and the distributing unit; the distributing unit is connected to the atmosphere circuit, and the microprocessor transmits the room atmosphere conditions in the storage memory to the atmosphere circuit via the distributing unit; the light device, temperature device, and audio device generate corresponding effects to synchronously control a light, temperature, and audio effects in accordance with a room atmosphere mode set by a user; the microprocessor is electrically connected to the data receiving unit, the data receiving unit receives the audio condition, light condition, and temperature condition of the room atmosphere conditions, and the adjusted room atmosphere conditions are transmitted to the distributing unit via the microprocessor, whereby an output audio condition, light condition, and temperature condition are modified by the atmosphere circuit; the microprocessor is connected to the data receiving unit, the storage memory, and the distributing unit respectively, while the distributing unit is connected to the wireless circuit, so that upon operation, required room atmosphere conditions are mainly received by the data receiving unit, and the microprocessor transmits a selected room atmosphere condition from the storage memory to the distributing unit; the distributing unit divides the room atmosphere conditions into audio condition, light condition, temperature condition, and transmits to the wireless circuit, then the wireless circuit transmits the room atmosphere conditions comprising audio condition, light condition, temperature condition to the wireless circuit.

2. The room lighting atmosphere creating system according to claim 1, wherein the microprocessor is further connected to a sensing circuit for detecting room atmosphere effects and generating the room atmosphere condition to transmit to the microprocessor; the sensing circuit includes at least one or more light sensors, one or more temperature sensors, and one or more audio sensors.

3. The room lighting atmosphere creating system according to claim 1, wherein the atmosphere circuit is disposed within the light device, the temperature device, and the audio device.

4. The room lighting atmosphere creating system according to claim 3, wherein the light device is one of a wall lamp, a ceiling lamp, a desk lamp, a standing lamp, a table lamp, a bed lamp, or an indoor lighting device; the temperature device is one of a electric fan, a dehumidifier, a window type air conditioner, a split type air conditioner, a package type air conditioner, or an indoor air conditioning device; and the audio device is one of a home theater, a desktop stereo, a bed stereo, a CRT display, an LCD, and a multimedia player or an indoor multimedia outputting device.

5. The room lighting atmosphere creating system according to claim 1, wherein the distributing unit transmits the light condition to the light device via the atmosphere circuit so that the light device generates corresponding light effect; the distributing unit transmits the temperature condition to the temperature device via the atmosphere circuit so that the temperature device generates corresponding temperature effect; the distributing unit transmits the audio condition to the audio device via the atmosphere circuit so that the audio device generates corresponding audio effect.

6. The room lighting atmosphere creating system according to claim 1, wherein the data receiving unit is one of a wall switch, a stem mounted switch, a button switch, a toggle switch, a keyboard or a touch panel, and an infrared remote control.

7. The room lighting atmosphere creating system according to claim 1, wherein the storage memory is one of a memory card, a hard disk, a flash memory, a rewritable disc, or a read-/writable memory.

8. The room lighting atmosphere creating system according to claim 1, wherein the microprocessor, the distributing unit, and the atmosphere circuit are one of a single chip, a complex programmable logic device (CPLD), a DSP, a field programmable gate array (FPGA), a programmable logic controller (PLC), and a DMX512.

\* \* \* \* \*